(12) United States Patent
Thelen

(10) Patent No.: US 9,526,207 B2
(45) Date of Patent: Dec. 27, 2016

(54) TREE FRUIT OR NUT CATCHING APPARATUS

(71) Applicant: Bernard Thelen, Portage, MI (US)

(72) Inventor: Bernard Thelen, Portage, MI (US)

( * ) Notice: Subject to any disclaimer, the term of this patent is extended or adjusted under 35 U.S.C. 154(b) by 168 days.

(21) Appl. No.: 14/331,516

(22) Filed: Jul. 15, 2014

(65) Prior Publication Data

US 2015/0020491 A1   Jan. 22, 2015

Related U.S. Application Data

(60) Provisional application No. 61/846,732, filed on Jul. 16, 2013, provisional application No. 61/857,872, filed on Jul. 24, 2013.

(51) Int. Cl.
*A01D 46/26* (2006.01)

(52) U.S. Cl.
CPC ......... *A01D 46/26* (2013.01); *A01D 2046/262* (2013.01)

(58) Field of Classification Search
CPC combination set(s) only.
See application file for complete search history.

(56) References Cited

U.S. PATENT DOCUMENTS

| 816,186 | A | | 3/1906 | Roberts | |
|---|---|---|---|---|---|
| 1,256,890 | A | | 2/1918 | Flinn | |
| 1,302,243 | A | * | 4/1919 | Teague | A01D 46/26 56/329 |
| 1,361,029 | A | * | 12/1920 | Druze | A01D 46/26 56/329 |
| 1,732,127 | A | * | 10/1929 | Helsel | A01D 46/26 56/329 |
| 1,801,272 | A | * | 4/1931 | Helsel | A01D 46/26 56/329 |
| 2,649,680 | A | * | 8/1953 | Brown | A01D 46/26 43/108 |
| 4,901,513 | A | | 2/1990 | Kim et al. | |
| 2005/0178099 | A1 | * | 8/2005 | Matheis | A01D 46/26 56/1 |

FOREIGN PATENT DOCUMENTS

| CH | 159089 | | 12/1932 | | |
|---|---|---|---|---|---|
| DE | 9318658 U1 | * | 2/1994 | ............. | A01D 46/26 |
| FR | 2829354 A3 | * | 3/2003 | ............. | A01D 46/26 |

\* cited by examiner

*Primary Examiner* — Alicia Torres
(74) *Attorney, Agent, or Firm* — Young Basile Hanlon & MacFarlane, P.C.

(57) ABSTRACT

A tree fruit or nut harvesting apparatus includes first and second sheets. A pair of clamps is provided for each tree and traps overlapped side edges of the first and second sheets adjacent an upper end of a tree trunk. Opposite side edges of the first and second sheets are disposed at a downward and outward acute angle to the tree trunk to form the first and second sheets in an inverted V-shape. The side edges of the first and second sheets opposite from the tree trunk form collection trays. Each clamp may be coupled by a tape to tree branches. An intermediate support using the first and second overlapped clamps members is supported by tapes or ties to tree branches or on a ground mounted stake supporting an intermediate location of the first and second sheets between two adjacent trees.

19 Claims, 7 Drawing Sheets

TREE FRUIT OR NUT CATCHING APPARATUS

CROSS REFERENCE TO CO-PENDING APPLICATIONS

The present application claims priority to U.S. Provisional Application Ser. No. 61/846,732, filed Jul. 16, 2013, and to U.S. Provisional Application Ser. No. 61/857,872, filed Jul. 24, 2013, the contents of both of which are incorporated herein in their entirety.

BACKGROUND

The present description relates in general, to a tree grown fruit and nut harvesting apparatus.

Fruit and nut orchards typically have a plurality of parallel rows of trees, where each row is formed of numerous trees, generally equally spaced apart along each row. This arrangement allows easy fertilizing, clean-up of the trees as well as harvesting of the fruit and nuts.

In the past, growers have employed chemicals to induce the fruit and nuts to fall from a tree at generally the same time from a tree when a tree is shaken by a mechanical shaker. The fruit and nuts are then collected from the ground.

Organic farming does not allow the use of chemicals which are commonly used in orchards to induce fruit and nuts to fall at the same time from a tree. In organic farming, the fruit or nuts are allowed to ripen naturally over a three to five week period. The fruit or nuts naturally fall from the trees when fully ripened without mechanical or manual shaking of the tree.

Thus, it would be desirable to provide a fruit and nut harvesting apparatus which provides a convenient means of collecting the naturally ripened fruit and nuts from trees which have fallen of their own accord from the trees.

SUMMARY

A fruit tree or nut harvesting apparatus includes first and second sheets, each having opposed first and second edges. A pair of clamps are provided for each tree in an orchard. Each pair of clamps overlaps first side edges of the first and second sheets adjacent an upper end of a tree trunk. The second side edges of the first and second sheets are disposed in a downward and outward angle from the clamps and the tree trunk to the ground surface to form the first and second sheets into a joined, continuous, inverted V-shape, to allow fruit and/or nuts falling from the tree to move over the first and second sheets toward the second side edges of the first and second sheets for easy collection.

At least one of the second side edges of the first and second sheets can be formed as a collection tray. The at least one side edge can be wound in a roll to form the collection tray.

Stakes may be inserted through the first and second sheets adjacent the second edges of the first and second sheets to maintain the first and second sheets in the inverted V-shape.

Each pair of clamps may include a first inner clamp member over which the first side edges of the first and second sheets are overlapped. A second outer clamp member receives the first clamp member in an interference fit trapping the overlap first side edges of the first and second sheets between the first inner clamp and the second outer clamp.

Supports are provided for supporting the pair of clamps in a position adjacent an upper end of a tree trunk. The supports may include a tie coupled to each pair of clamps, and a flexible strap member coupled to the tie to a tree branch.

Alternately, the supports may include an eyebolt fixed through an end portion of at least a second clamp member, and a flexible strip secured to the eyebolt and a tree branch.

An intermediate support may be provided for supporting the first and second sheets intermediately between two adjacent trees. The intermediate support may include an elongated ground mountable stake disposed intermediate two adjacent trees on a tree row. A clamp including one or more second clamp members are engaged over the first side edges of the first and second sheets that are overlapped over the first clamp member. The first clamp member receives an upper end of the stake.

The intermediate support may also include a connector carried by the at least one second clamp member, and a tape secured at opposite ends to tree branches in two adjacent trees in a tree row and extending through the connector on the at least one second clamp member.

BRIEF DESCRIPTION OF THE DRAWING

The various features, advantages and other uses of the present tree fruit or nut harvesting apparatus will become more apparent by referring to the detailed description and drawing in which.

DETAILED DESCRIPTION

Figure 1:
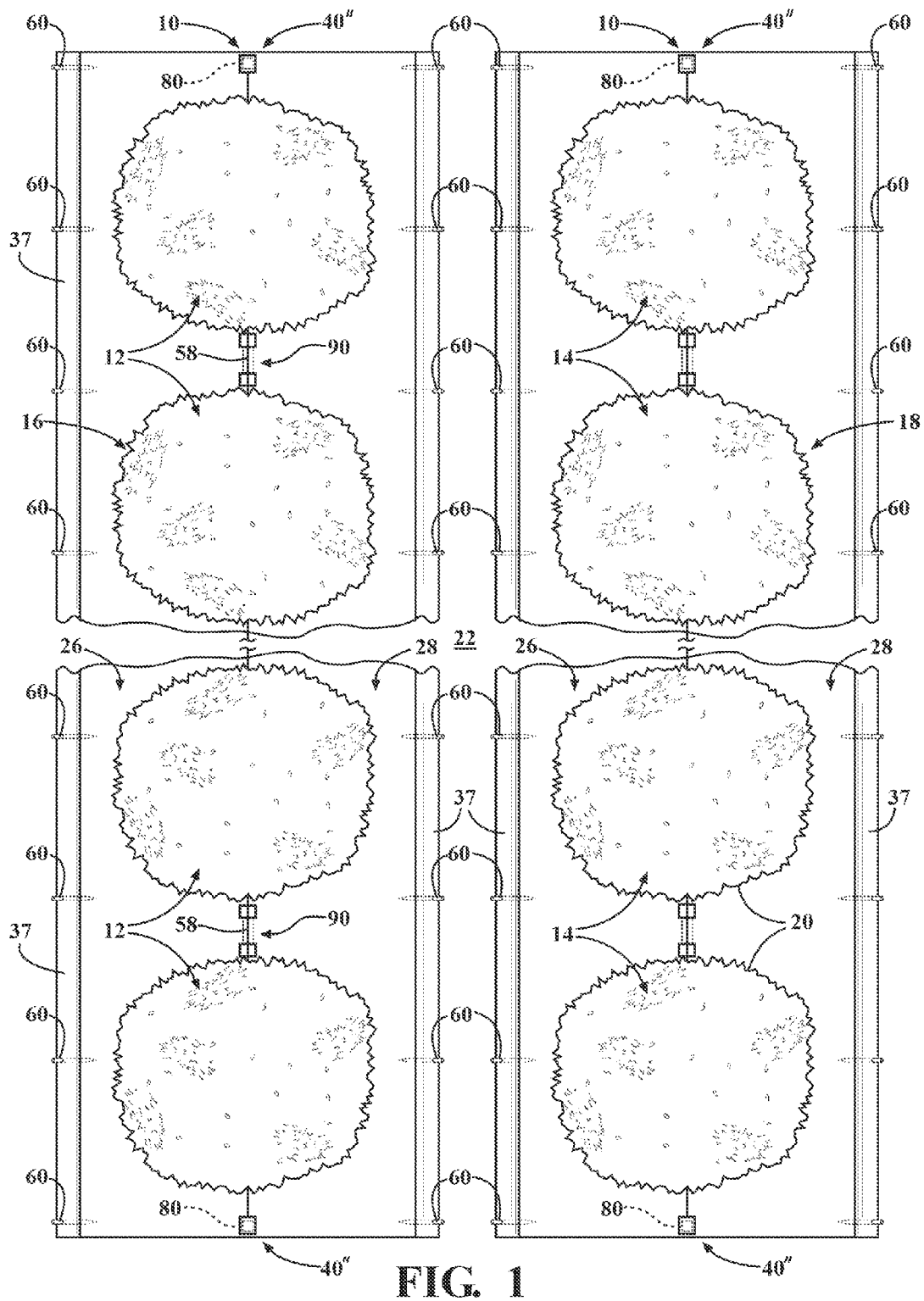
FIG. 1 is a plan view of two rows of trees using one aspect of a tree harvesting apparatus.

Referring now to the drawing, and to FIGS. 1-8 in particular, there is depicted a tree fruit and nut harvesting apparatus 10. The apparatus 10 can be used in orchards containing a plurality of trees 12 and 14 arranged in substantially parallel rows 16 and 18, respectively.

The number of trees 12 and 14 in each respective row 16 and 18 can vary as well as can the spacing between individual trees 12 in the row 16 or the individual trees 14 in the row 18. The spacing or distance between in each row 16 and 18 of trees 12 and 14 can also vary.

In addition, the harvesting apparatus 10 may also be employed to easily collect anything that falls from a tree, such as leaves, branches, seeds, etc.

For example, the trees 12 and 14 will be described as nut trees, such as chestnut, hazelnut, macadamia nuts, etc. It will be understood that the tree harvesting apparatus 10 may also be employed with fruit trees, such as apples, oranges, etc.

Also, for example, the trees 12 in the row 16 may be spaced any distance apart, such as 15-20 feet, for example. The rows 16 and 18 may be spaced 25-30 feet, for example, between the tree trunks of the trees 12 and 14 in each row 16 and 18. This spacing is selected so that the outer periphery or extent of the drip lines of the trees 12 and 14 are spaced from the outer periphery or extent of the drip lines in the nearest tree in the adjacent row of trees so as to provide an open path 22 between the two tree rows 16 and 18.

The tree fruit and nut harvesting apparatus 10 provides a convenient means of collecting the naturally ripened fruit and nuts from the trees 12 and 14 which have fallen of their own accord onto the tree harvesting apparatus 10 and collected in troughs or trays along the outer side edges of the tree harvesting apparatus 10 in each tree row 16 and 18.

Figure 2:
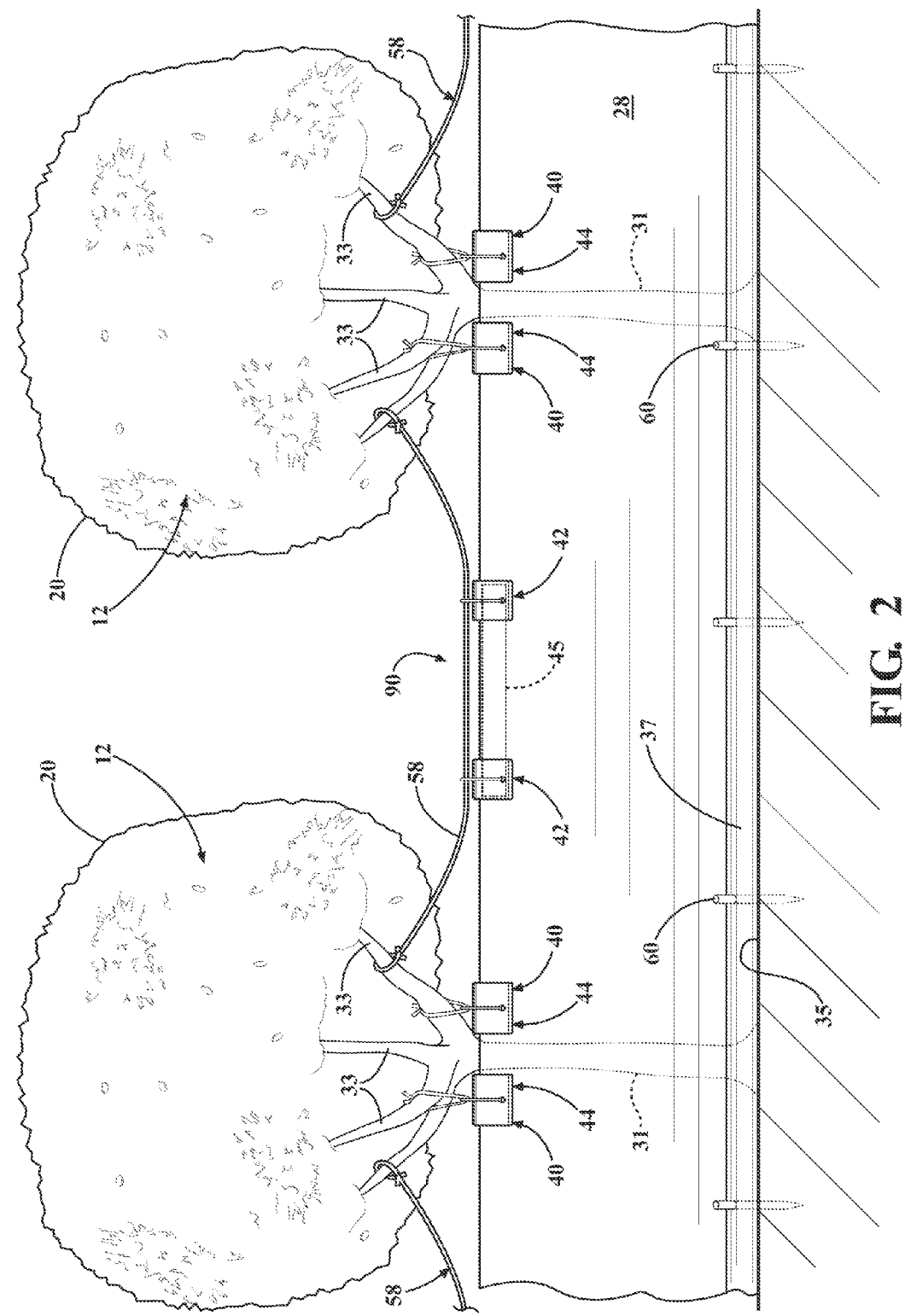
FIG. 2 is a side elevational view of a portion of one row of trees in FIG. 1.
Figure 3:
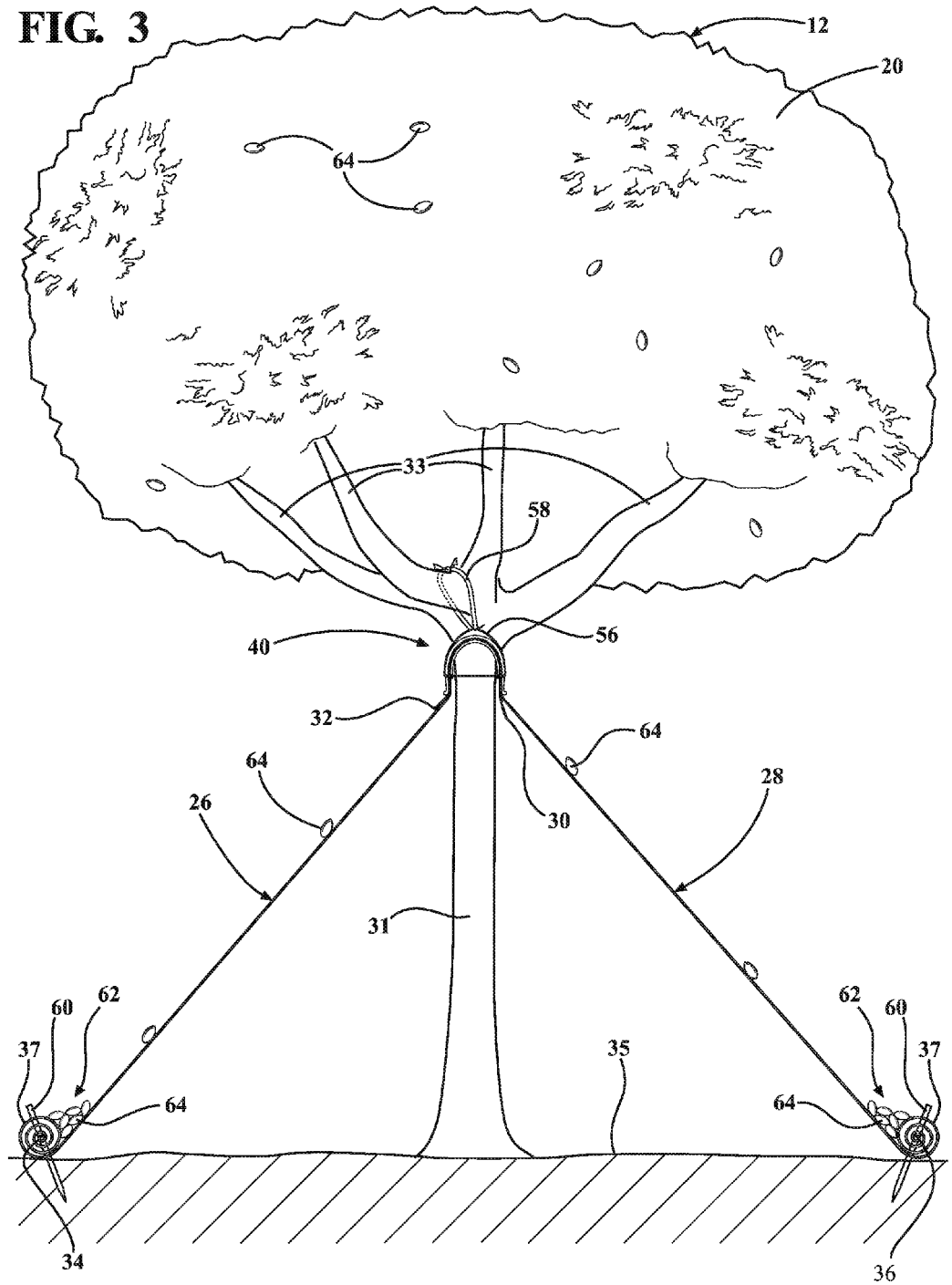
FIG. 3 is an end elevational view of the apparatus shown in FIG. 1.

As shown in FIGS. 1-4, the tree harvesting apparatus 10 includes first and second elongated, flexible, planar tarps or sheets 26 and 28. As shown in FIG. 3, each of the first and second tarps 26 and 28 have first longitudinally extending side edges 30 and 32, respectively, and opposed second side edges 34 and 36, respectively.

The first and second tarps 26 and 28 may be formed of a geo-turf type water pervious material which is strong enough to collect and allow the fruit or nuts dropping from the trees 12 and 14 to roll downward along each first and second tarps 26 and 28 to the second side edges 34 and 36, respectively, of the first and second tarps 26 and 28. At the same time, the first and second tarps 26 and 28 allow water and air to pass through the tarps 26 and 28.

The first and second tarps 26 and 28 may each be provided in a single elongated strip which may run from 20 to 30 feet for a single tree up to 200 to 700 feet or more in length for multiple trees, in one row 16 or 18. It will be understood that each of the first and second tarps 26 and 28 may be formed of individual sections of the same or varying lengths which are knitted, tied, or otherwise integrally joined together end to end or in an overlapped connection with ends the arranged and held in position by the clamps described hereafter.

Before describing the clamps, as shown in FIG. 2, each tree 12 includes a tree trunk or bole 31 extending from a ground surface 35 on upper end. Branches or limbs 33 extend from the top of the tree trunk or bole 31 and carry the foliage and the fruits or nuts grown by the tree 12. By example, the top end of the tree trunk or bole 31 is approximately three to four feet above the ground surface 35.

The first and second tarps 26 and 28 in each row 16 and 18 are clamped together with the first side edges 30 and 32 overlapped as shown in FIG. 3 and mounted adjacent the upper end of the tree trunk or bole 31 as shown in FIG. 2. A pair of clamps 40 are used for each tree 12.

Figure 4:
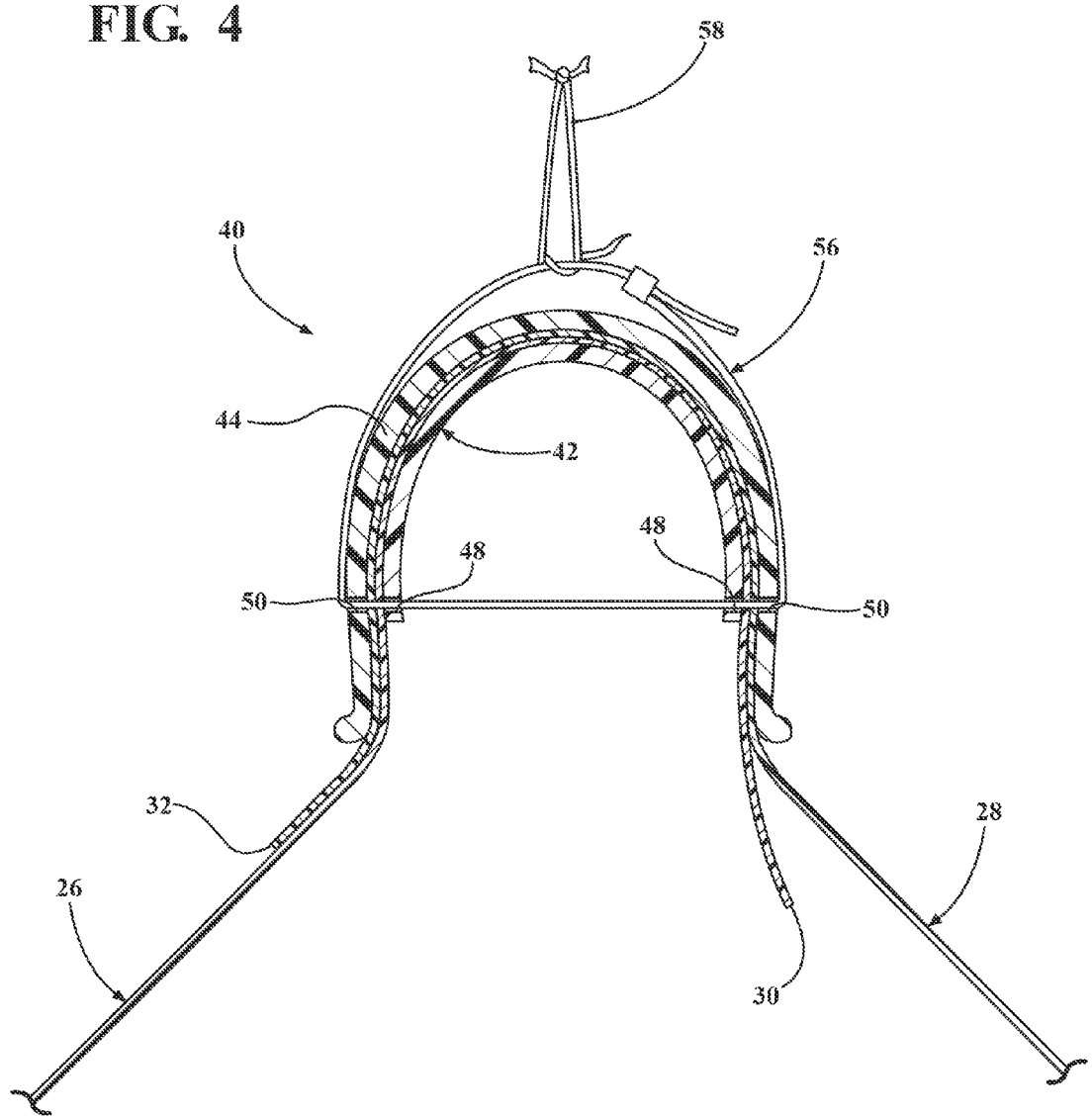
FIG. 4 is an enlarged cross-sectional view of the clamp used in the apparatus shown in FIG. 1.

Each clamp 40, as depicted in detail in one aspect of the clamp 40 shown in FIG. 4, includes a first inner disposed elongated, longitudinally extending first clamp member 42. The first clamp member 42 may be formed of a suitable lightweight material, such as PVC, and formed into a generally semi-circular or U-shape. The diameter of the first clamp member 42 is slightly smaller than the diameter of a second outer clamp member 44, so that the second clamp member 44 receives the first clamp member in an interference fit.

The first clamp member 42 can be provided in a length of approximately four inches, for example. The second clamp member 44 also has a short length of approximately four inches or slightly more, for example. The second clamp member 44 has an inverted U-shape in use and may also be formed of a water resistant material, such as PVC.

As seen in FIG. 4, the first side edges 30 and 32 of the first and second tarps 26 and 28 are overlapped over the outer surface of the first clamp member 42 when the first clamp member is abutted up against or is positioned in close proximity to the upper end of the tree trunk or bole 31 of one tree 12 or 14, or approximately three to four feet above the ground. The first clamp member 42 is then snapped or press fit into the interior of the second clamp member 44 to securely and fixedly clamp the overlapped first side edges 30 and 32 of the first and second tarps 26 and 28 in a fixed or locked position.

This clamping arrangement continues with a pair of clamps 40 for each tree 12 along the entire length of the tree rows 16 and 18. With the pair of clamps 40 in close proximity to or abutting the tree trunk 31 three to four feet above the ground, the portions of the first side edges 30 and 32 of the first and second tarps 26 and 28 between the pair of clamps 40 are folded under themselves around the tree trunk 31. In this manner, the overlapped first side ends 30 and 32 of the first and second tarps 26 and 28 are supported above the ground surface 35 at approximately the upper end of the tree trunk or bole 31.

Further support of the clamps 40 in the elevated position adjacent the upper end of the tree trunk or bole 31 is provided by aligned apertures 48 in the first clamp member only or apertures 50 in the second clamp member 44 which can be aligned with the apertures 48 in the first clamp member 42. An awl or other sharp pointed instrument is used to pierce the portions of the tarps 26 and 28 extending between the aligned apertures 48 and 50 to provide an opening passing completely through the opposed sides of one or both of the clamps 40. A connector, such as a zip tie 56, or tie lock, is inserted through the aligned apertures 48 and 50 and secured to itself. An elongated, flexible strip or tape member 58 is secured around the zip tie 56 and secured by a knot or other means around one of the tree branches 33 to support each clamp 40 in the elevated position immediately beneath the foliage 20 three to four feet above the ground at the upper end of the tree trunk or bole 31. The strip member 58 can be a rope, cable, tree banding tape, etc., (all hereafter referred to as a "tape").

Referring to FIG. 3, with each clamp 40 supported at the upper end of the tree trunk or bole 31, the second ends 34 and 36 of the first and second tarps 26 and 28, respectively, are extended outward from the pair of clamps 40 toward the ground surface to a position beyond the peripheral extent of the tree drip lines of the tree foliage 20 to a location approximate opposite sides of the path 22 between the two adjacent tree rows 16 and 18 at an approximately 30 to 45 degree acute angle with respect to the tree trunk 31. The second side ends 34 and 36 of the first and second tarps 26 and 28 may be secured in place by stakes 60 forcibly inserted through the first and second tarps 26 and 28 into the ground 35 at the location of each tree truck 31, for example, or elsewhere along the lengths of the first and second tarps 26 and 28.

The stakes 60 may take any suitable form capable of piercing the second edges 34 and 36 of the first and second tarps 26 and 28 as well as to be able to be driven manually or by use of a hammer into the ground 35. The stakes 60, which may be formed by metal, plastic, wood, or other suitable material, can be in the form of an elongated spike or an inverted U-shaped hoop.

Alternately, for easier collection of the fruits or nuts that have dropped from the tree 12, the outermost second side edges 34 and 36 of the first and second tarps 26 and 28, respectively, are formed into a tray or trough 62, such as by rolling the second side edges 34 and 36 three to four times into a roll 37 before the stakes 60 are forcibly inserted through each roll 37 into the ground 35. This arrangement creates the tray 62 shown in FIG. 3 that forms a convenient location to accumulate the nuts 64 that drop from the tree 12.

The stakes 60 maintain tension on the first and second tarps 26 and 28 to create a generally linear extent for each first and second tarps 26 and 28 between the rolls 37 at the second side ends 34 and 36 of the first and second tarps 26 and 28 and the upper first ends 30 and 32 of the first and second tarps 26 and 28 at the clamps 40. This provides a convenient surface to allow the nuts 64 falling from the tree 12 to roll downward along tarps 26 and 28 into the trays 62.

In this manner, the nuts 64 which may ripen naturally over a 3-5 week period fall of their own accord, when they reach their full growth state, onto the first and second tarps 26 and 28. Due to the inverted V-shape of the first and second tarps 26 and 28, the nuts 64 roll along the first and second tarps 26 and 28 to the trays 62 formed at the outer second side edges 34 for easy collection by a worker on the path 22.

It will be understood that the second side edges 34 and 36 of the first and second tarps 26 and 28 may alternately be staked directly to the ground surface 35 so that the nuts 64 roll off of the first and second tarps 26 and 28 into the path 22 between two adjacent tree rows 16 and 18.

Figure 5:
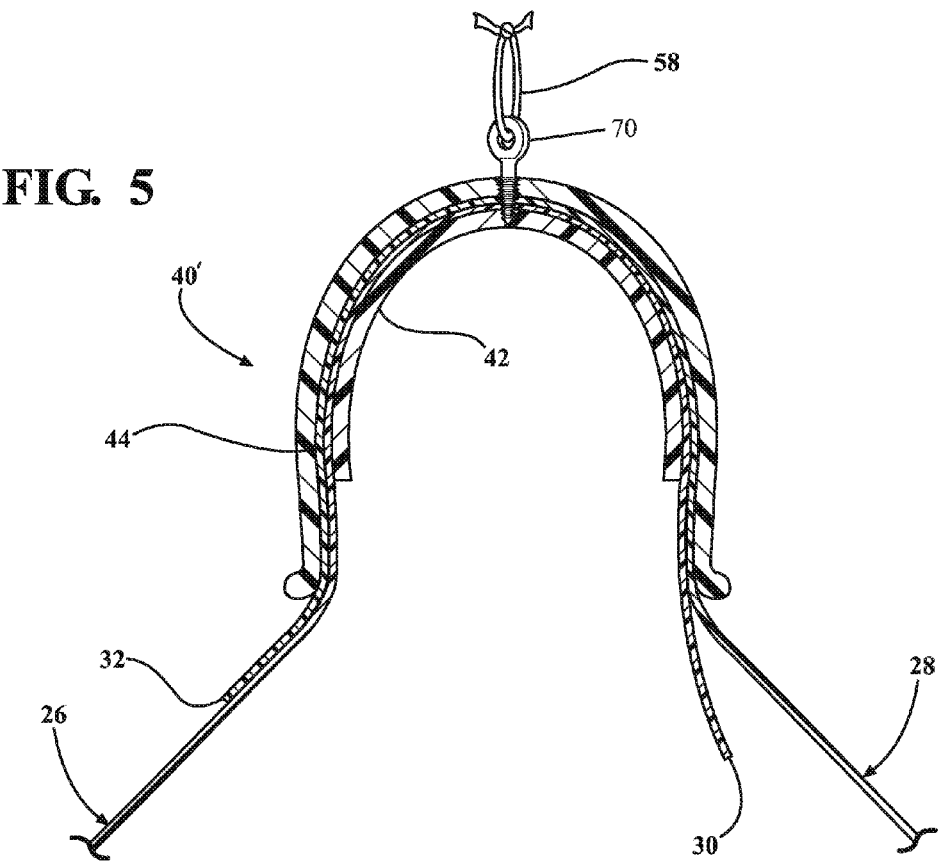
FIG. 5 is an end view of another aspect of the clamp shown in FIG. 4.

FIG. 5 depicts an alternate means for supporting each clamp 40' adjacent the upper end of the tree trunk or bole 31. In this aspect, an eye bolt or screw 70 is threadingly inserted through aligned apertures in the central ends of the first and second clamp members 42 and 44 of the modified clamp 40' and through the overlapped portions of the first and second tarps 26 and 28. Strip-like members of a tape 58 inserted through the eye of the eyebolt 70 and secured to a tree branch 32 support the clamp 40' at the upper end of the tree trunk or bole 31.

Figure 6:
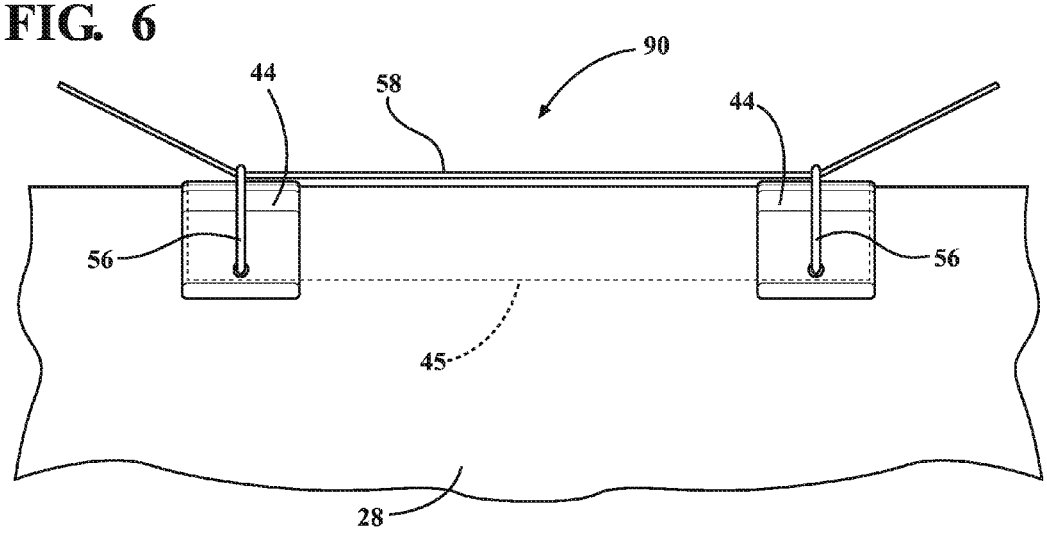
FIG. 6 is a side elevational view of a center support shown in FIG. 1.

Intermediate supports can be provided generally centrally between each tree trunk 31 in each tree row 16 and 18. As shown in FIGS. 2 and 6, one aspect of an intermediate support 90 includes a support clamp formed of a first support clamp member 45. The first support clamp member 45 is similar in cross-sectional shape as the first inner clamp member 42; of the clamp 40, but has an elongated length, such as a four foot length, for example. The first support clamp member 45 is still disposed interiorly beneath the overlapped first side edges 30 and 32 of the first and second tarps 26 and 28, respectfully. At least one or two second, outer support clamp members 44 are snapped or press fit over opposite ends of the first support clamp members 45. A zip tie 56 extends through the clamp support members 44 and 45 and receives an elongated tape 58.

As shown in FIG. 2, opposite ends of the tape 58 are tied around branches in two adjacent trees 12. The tape 58 extends from each end through the zip ties 56 to support the intermediate portion of the overlapped first and second tarps 26 and 28 approximately three to four feet above the ground.

Figure 7:
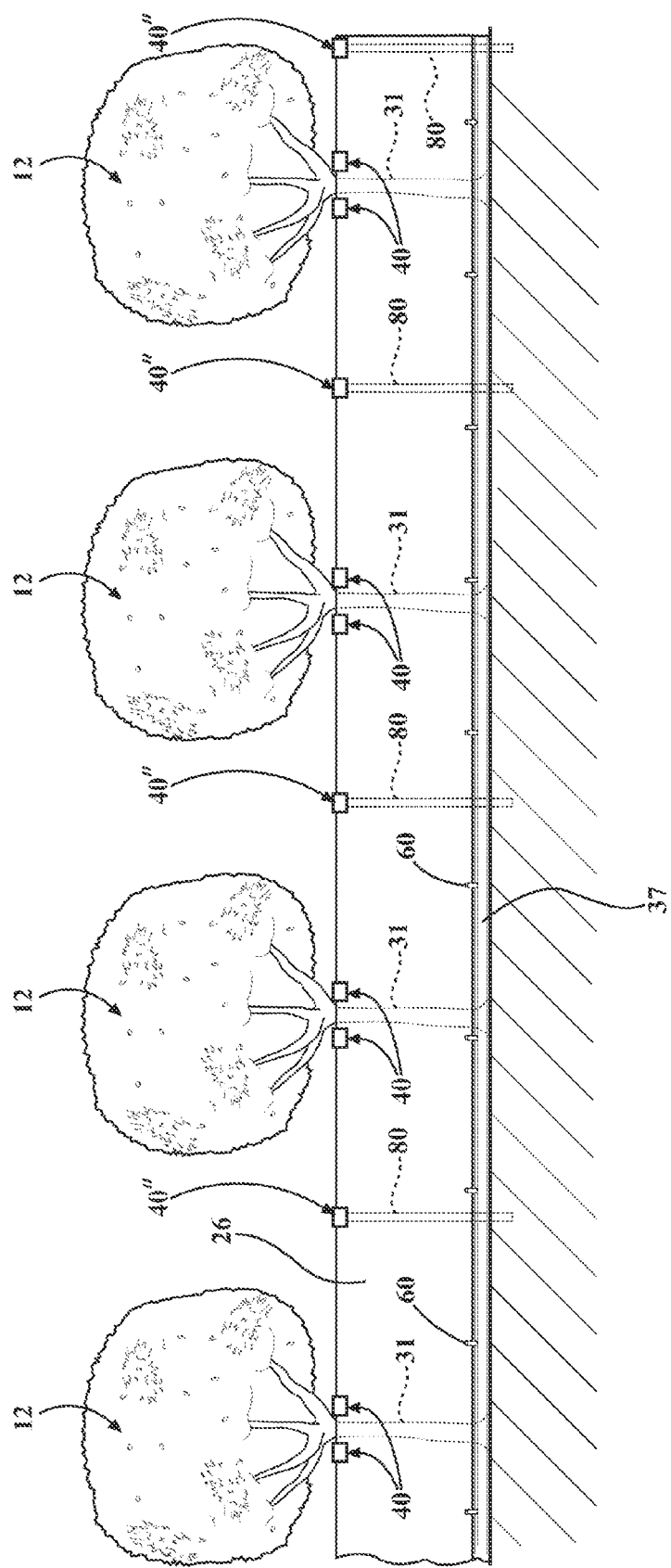
FIG. 7 is a side elevational view showing an alternate modified apparatus.
Figure 8:
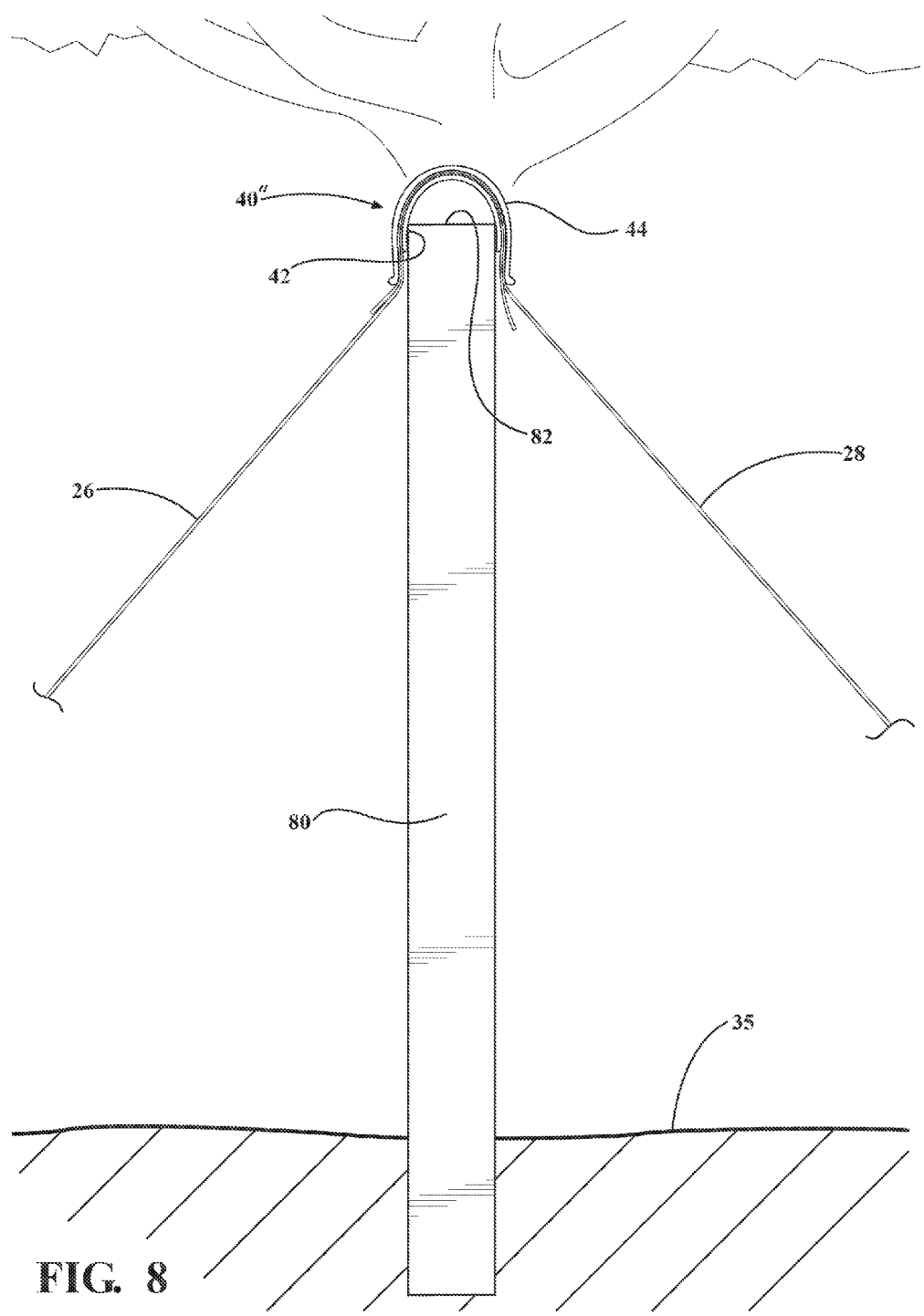
FIG. 8 is an end elevational view showing the use of an intermediate stake and clamp shown in FIG. 7.

Another aspect of an intermediate support is shown in FIGS. 7 and 8. Each intermediate support includes an elongated ground mountable stake 80 which has a height of at least four feet, for example. One end of the stake 80 is fixed in the ground 35 with a major extent or a three or four foot length of the stake 80 extending vertically upward. An upper end 82 of the stake 80 fits securely in a snap or press fit within the inner or first clamp member 42 or 45 of a clamp 40" associated with each stake 80. The support clamp 40" requires an outer or second clamp member 44 to form a snap fit to the first clamp member 42 or 45, trapping the overlapped first side edges 30 and 32 of the first and second tarps 26 and 28 therebetween.

The stake 80 and the associated clamp support 40" form a support which maintains the entire inner first support clamp member 42 at a three to four foot height above the ground surface 35 intermediately between two trees 12 to enable the first and second tarps 26 and 28 to retain the inverted V-shape shown in FIG. 3 along their entire length.

It will be understood that the stake 80 and the clamp 40" may be employed at the outer ends of each tree harvesting apparatus 10 associated with an entire row 16 or 18 of trees 12 and 14. The stake 80 and the clamp 40" thus supports the outer end portions of the first and second tarps 26 and 28 as seen in FIG. 1.

The tree harvesting apparatus 10 described above not only provides for easy collection of nuts or fruit which have fallen from a tree thereby reducing labor costs, but also increases moisture retention around the trees and kills weeds under the tarps so that the trees receive a greater portion of rainfall or water.

In addition, because the trays 62 at the lower side ends of the tarps 26 and 28 are positioned at or beyond the drip line of the trees; 12 and 14, which is generally adjacent to the sides of the path or lane 22 between two rows 16 and 18 of trees 12 and 14, the nuts accumulated in the trays 62 may be easily collected by any available collection means, such as manually by hand, shovel or scoop, or by using a vacuum collection system.

When hand collection is employed, the first and second tarps 26 and 28 maximize nut collection since the workers do not have to search through the tall weeds and grass normally found under the trees, which can lead to the non-collection of some nuts. The accumulation of nuts in the trays 62 also eliminates the need for orchard labor to crawl underneath the trees 12 and 14 to manually collect nuts or use a shovel or a vacuum hose collection system to collect nuts. Since the workers themselves and the collection equipment they employ frequently damage the lower hanging limbs of the tree or the tree trunk, the harvesting apparatus 10 minimizes potential damage to the trees.

If a vacuum collection system is employed, the first and second tarps 26 and 28 eliminate the vacuuming of debris, soil, and dust, which are typically found beneath the tree 12 and 14 while collecting the nuts. The first and second tarps 26 and 28 eliminate a significant amount of such airborne dust which is exhausted from the vacuum collection system.

What is claimed is:

1. A tree fruit or nut harvesting apparatus for trees arranged in spaced rows comprising:
   first and second sheets, each having opposed first and second side edges;
   a pair of clamps for each tree;
   each pair of clamps comprising an inner clamp member and an outer clamp member receiving the inner clamp member in an interference fit, and trapping overlapped first side edges of the first and second sheets therebetween adjacent an upper end of a tree trunk; and
   the second side edges of the first and second sheets disposed at a downward and outward angle from the clamps to ground surface to form the first and second sheets in a joined inverted V-shape to allow fruit or nuts falling from a tree to move over the first and second sheets toward the second side edges of the first and second sheets.

2. The apparatus of claim 1 further comprising:
   at least one of the second side edges of the first and second sheets forming a collection tray.

3. The apparatus of claim 2 wherein the second side edges of the first and second sheets are wound in a roll to form the collection tray.

4. The apparatus of claim 1 further comprising:
stakes inserted in the first and second sheets to maintain the first and second sheets in the inverted V-shape.

5. The apparatus of claim 1 further comprising:
means for supporting the pair of clamps at a position adjacent the upper end of the tree trunk.

6. The apparatus of claim 5 wherein the supporting means comprises:
a tie coupled to each pair of clamps; and
a flexible strip member coupled through the tie to a tree branch.

7. The apparatus of claim 5 wherein the supporting means comprises:
an eyebolt fixed through an end portion of at least the outer clamp member; and
a flexible strip secured to the eyebolt and a tree branch for supporting the pair of clamps at the upper end of the tree trunk.

8. A tree fruit or nut harvesting apparatus for trees arranged in spaced rows comprising:
first and second sheets, each having opposed first and second side edges;
a pair of clamps for each tree, each pair of clamps clamping overlapped first side edges of the first and second sheets adjacent an upper end of a tree trunk;
the second side edges of the first and second sheets disposed at a downward and outward angle from the clamps to ground surface to form the first and second sheets in a joined inverted V-shape to allow fruit or nuts falling from a tree to move over the first and second sheets toward the second side edges of the first and second sheets; and
an intermediate support supporting the first and second sheets between two adjacent trees, the intermediate support including:
an elongated ground mountable stake disposed intermediate two adjacent tree trunks in a tree row; and
a support clamp including a first clamp member engaged over the overlapped first side edges of the first and second sheets and a second clamp member that receives an upper end of the stake in a press fit.

9. A tree fruit or nut harvesting apparatus for trees arranged in spaced rows comprising:
first and second sheets, each having opposed first and second side edges;
a pair of clamps for each tree, each pair of clamps clamping overlapped first side edges of the first and second sheets adjacent an upper end of a tree trunk;
the second side edges of the first and second sheets disposed at a downward and outward angle from the clamps to ground surface to form the first and second sheets in a joined inverted V-shape to allow fruit or nuts falling from a tree to move over the first and second sheets toward the second side edges of the first and second sheets; and an intermediate support comprising:
a first clamp member over which the overlapped first side edges of the first and second sheets extend, the first clamp member located between two adjacent trees in a tree row;
at least one second clamp member engaged over the first clamp member and the overlapped first side edges of the first and second sheets in an interference fit;
a connector carried by each second clamp member; and
a tape secured to the connector and to at least one branch of a tree of the two adjacent trees.

10. The apparatus of claim 9 wherein:
the first clamp member comprises an elongate semi-circular or U-shape;
at least one second clamp member comprises two second clamp members, each having a semi-circular or U-shape and engaged with the first clamp member in the interference fit; and
the tape extends through the connector of each of the two second clamp members and is secured at opposite ends to branches in two adjacent trees in the tree row.

11. The apparatus of claim 9 wherein the first and second sheets each comprise a single elongate, rectangular shape extending between at least two trees in the tree row.

12. The apparatus of claim 9 wherein the first and second sheets each comprise a water pervious material.

13. The apparatus of claim 9 wherein each clamp of the pair of clamps comprises an inner clamp member and an outer clamp member having a semi-circular or U-shape and an interference fit to clamp the first side edges of the first and second sheets therebetween.

14. The apparatus of claim 8 wherein the first clamp and the second clamp each comprise a semi-circular or U-shape clamping the overlapped first side edges of the first and second sheets therebetween.

15. The apparatus of claim 1 wherein each clamp of the pair of clamps comprises an inner clamp member and an outer clamp member having a semi-circular or U-shape and an interference fit to clamp the overlapped first side edges of the first and second sheets therebetween.

16. The apparatus of claim 1 wherein the downward and outward angle is an acute angle to the tree trunk.

17. The apparatus of claim 1 wherein the first and second sheets each comprise an elongate, rectangular shape and a water pervious material.

18. The apparatus of claim 1 further comprising:
stakes inserted in the second side edges of the first and second sheets to secure the second side edges to the ground surface.

19. The apparatus of claim 18 wherein:
the stakes extend through a respective roll formed by winding the second side edges of the first and second sheets adjacent to the ground surface.

* * * * *